March 14, 1939. G. GOLTZ 2,150,499
AUTOMATIC WATER FOUNTAIN FOR CHICKENS
Filed Sept. 22, 1937
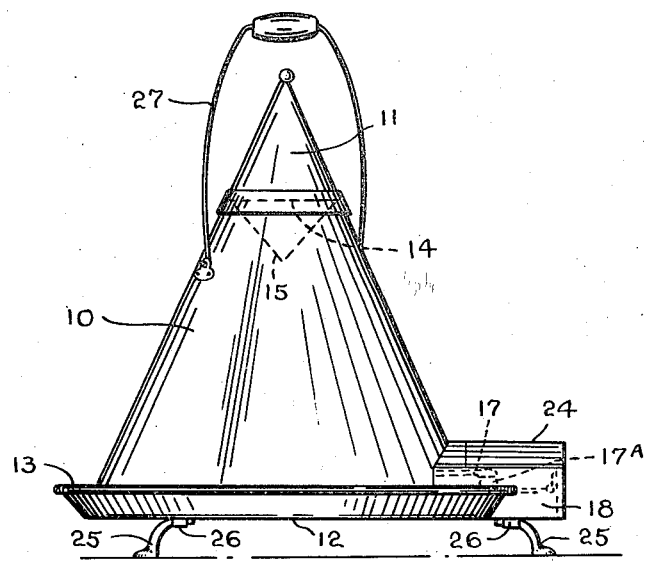
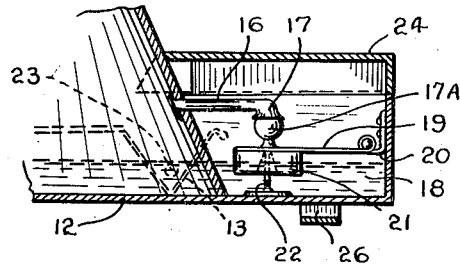
INVENTOR
Gus Goltz.
By Ralph Burch
Attorney Patented Mar. 14, 1939

2,150,499

UNITED STATES PATENT OFFICE 2,150,499

AUTOMATIC WATER FOUNTAIN FOR CHICKENS

Gus Goltz, Beausejour, Manitoba, Canada, assignor of one-half to Gus Stebbe, Beausejour, Manitoba, Canada Application September 22, 1937, Serial No. 165,189
In Canada May 20, 1937

1 Claim. (Cl. 119—77)

This invention relates to improvements in a poultry drinking fountain. Its primary object being to provide a drinking fountain for poultry having a reservoir associated therewith.

A further object of the invention is to provide a drinking fountain for poultry having a reservoir associated therewith and automatic valve means whereby a constant water level is maintained in the drinking trough.

A still further object of the invention is to provide a drinking fountain having means to adjust the height thereof to suit the growing chickens.

With these and other objects in view that may appear while the description proceeds, the invention consists in the novel construction and arrangement of parts as hereinafter more specifically set forth, claimed and shown in the accompanying drawing and in which:—

Fig. 1 is an elevation view of my improved poultry drinking fountain.

Fig. 2 is a fragmentary sectional view showing the automatic valve whereby a constant water level is maintained in the water trough.

Referring more in detail to the drawing in which similar reference characters designate corresponding parts it will be seen the invention comprises a conical shaped reservoir 10 having a removable upper portion 11 which forms a cap for the reservoir. The base 12 to which the reservoir is soldered or otherwise secured is turned upward angularly at the outer edge to form a drinking trough 13 between the said edge and the lower part of the said reservoir. Said drinking trough is therefore of V shape in section and extends around the periphery of the structure.

The water is poured into the reservoir through the top 14 where a fine mesh sieve 15 is positioned to filter the water. An exit pipe 16 is secured in the lower part of the reservoir and extends outward therefrom, the outer end 17 being formed into a ball valve seat. A ball valve 17a is provided to operate in conjunction therewith to control the flow of water from the reservoir to the drinking trough. Said ball valve is mounted in a valve chamber 18 secured to the reservoir and trough and is supported for vertical movement on an arm 19 which is in turn pivoted to a bracket 20 secured to the wall of the valve chamber. Below the said arm 19 is a float 21 which is provided with a guide pin 22 secured to the floor of the valve chamber and arranged to keep the said ball valve in alignment with the valve seat as it moves up and down to open or close the said valve. The water is thereby permitted to enter the valve chamber until the float, which rises with the water, lifts the ball valve and closes the valve thereby shutting off the flow of water. An outlet 23 permits the water to run from the valve chamber to the drinking trough where a constant level is maintained and regulated by the action of the ball valve. A ridge is formed on the valve chamber cover 24 to keep the chickens from perching thereon.

The structure is supported on detachable legs 25 which are connected thereto by leg sockets 26 secured to the base 12. The legs are arranged to be detachable so that they may be removed when the device is used for small chicks and are replaced to raise the same as the chickens grow. A bail 27 is secured to the reservoir to provide carrying means for the device.

It is believed that the construction and advantages of the structure shown may be apparent from the foregoing paragraphs taken in conjunction with the accompanying drawing without further detailed description.

While the preferred embodiment of the invention has been disclosed it is understood that minor changes in the details of construction, combination and arrangement of co-operating parts may be resorted to within the scope of what is claimed without departing from the spirit of the invention.

I claim:

A poultry drinking fountain comprising a conical reservoir having its base extending beyond the walls of the reservoir and turned upward to form an annular trough, a float chamber attached to the side of the reservoir at the base thereof, a pipe connecting said reservoir with the float chamber above the base thereof, said pipe being disposed horizontally within the float chamber with its discharge end turned downwardly and flared to provide a valve seat, a float arm pivotally attached at one end to the outer wall of said float chamber, a ball valve mounted on the upper side of the free end of said float arm in alinement with the valve seat of said pipe, a float on the underside of said float arm beneath said ball valve, a guide pin extending upwardly from the bottom of said float chamber into an aperture in the bottom of said float for keeping said ball valve in alinement with its seat, and an outlet establishing communication between said float chamber and the trough.

GUS GOLTZ.